(12) United States Patent
Kozu et al.

(10) Patent No.: US 7,597,994 B2
(45) Date of Patent: Oct. 6, 2009

(54) BATTERY PACK

(75) Inventors: Katsumi Kozu, Sanda (JP); Koichi Inaba, Moriguchi (JP); Iichiro Mori, Itami (JP); Koici Toriyama, Moriguchi (JP); Naohiro Hamao, Hirakata (JP); Tadashi Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 217 days.

(21) Appl. No.: 10/494,153

(22) PCT Filed: Dec. 2, 2002

(86) PCT No.: PCT/JP02/12610

§ 371 (c)(1),
(2), (4) Date: Apr. 29, 2004

(87) PCT Pub. No.: WO03/049213

PCT Pub. Date: Dec. 6, 2003

(65) Prior Publication Data

US 2005/0164080 A1    Jul. 28, 2005

(30) Foreign Application Priority Data

Dec. 4, 2001 (JP) ............................. 2001-369738
Nov. 22, 2002 (JP) ............................. 2002-339667

(51) Int. Cl.
*H01M 2/02* (2006.01)

(52) U.S. Cl. .................. 429/121; 429/162; 429/163; 429/167; 429/175; 429/176; 429/177; 429/7; 429/152

(58) Field of Classification Search ........... 429/121, 429/163, 162, 167, 175, 177, 176, 7, 152
See application file for complete search history.

(56) References Cited

U.S. PATENT DOCUMENTS

| 3,948,441 | A |   | 4/1976 | Perkins et al. |
| 5,106,708 | A |   | 4/1992 | Bish et al. |
| 5,298,347 | A | * | 3/1994 | Aksoy et al. ............... 429/98 |
| 5,466,545 | A | * | 11/1995 | Chamberlain et al. ......... 429/99 |
| 5,508,131 | A |   | 4/1996 | Bowen et al. |
| 5,818,198 | A |   | 10/1998 | Mito et al. |
| 5,968,682 | A |   | 10/1999 | Moriyama et al. |
| 6,114,942 | A |   | 9/2000 | Kitamoto et al. |
| 6,117,576 | A |   | 9/2000 | Sugai |
| 6,210,824 | B1 |   | 4/2001 | Sullivan et al. |
| 6,432,575 | B1 |   | 8/2002 | Yamagami |
| 6,451,474 | B1 |   | 9/2002 | Kozu et al. |
| 6,524,732 | B1 |   | 2/2003 | Iwaizono et al. |

(Continued)

FOREIGN PATENT DOCUMENTS

JP          64-072458          3/1989

(Continued)

*Primary Examiner*—Jane Rhee
(74) *Attorney, Agent, or Firm*—Jordan and Hamburg LLP

(57) ABSTRACT

An outer case (10, 20, 35, 40) for housing a rechargeable battery (1, 31, 41) and a battery circuit therein is composed of an upper case (7, 21, 42) and a lower case (8, 22, 43), each being formed as a half-shell body. The respective bottom faces of the upper case (7, 21, 42) and the lower case (8, 22, 43) are formed of film members (7b, 8b, 32, 34, 42b, 43b), and are integrally formed with resin moldings (7a, 8a, 33, 42c, 43c) forming circumferential side faces.

18 Claims, 6 Drawing Sheets

U.S. PATENT DOCUMENTS

| | | |
|---|---|---|
| 6,824,917 B2 | 11/2004 | Aaltonen et al. |
| 6,861,821 B2 | 3/2005 | Masumoto et al. |
| 6,994,926 B2 | 2/2006 | Ikeuchi et al. |
| 7,248,021 B2 | 7/2007 | Kozu et al. |
| 2002/0173709 A1 | 11/2002 | Fine et al. |
| 2003/0082441 A1 | 5/2003 | Hovi et al. |
| 2003/0173709 A1 | 9/2003 | Iwaizono et al. |
| 2005/0064286 A1 | 3/2005 | Kozu et al. |
| 2005/0106454 A1 | 5/2005 | Kozu et al. |
| 2005/0112456 A1 | 5/2005 | Kozu et al. |
| 2005/0151514 A1 | 7/2005 | Kozu et al. |

FOREIGN PATENT DOCUMENTS

| | | |
|---|---|---|
| JP | 4-162345 | 6/1992 |
| JP | 05-159758 | 6/1993 |
| JP | 07-057721 | 3/1995 |
| JP | 8-162078 | 6/1996 |
| JP | 9-134714 | 5/1997 |
| JP | 9-139235 | 5/1997 |
| JP | 10-275612 | 10/1998 |
| JP | 11-176400 | 7/1999 |
| JP | 2000-021372 | 1/2000 |
| JP | 2000-315483 | 11/2000 |
| JP | 2002-110121 | 4/2002 |
| JP | 2002-134077 | 5/2002 |
| JP | 2002-166447 | 6/2002 |
| JP | 2002-245994 | 8/2002 |
| JP | 2002-245999 | 8/2002 |
| JP | 2002-260608 | 9/2002 |
| JP | 2002-260609 | 9/2002 |
| JP | 2002-373630 | 12/2002 |
| JP | 2003-017022 | 1/2003 |
| JP | 2003-022789 | 1/2003 |
| JP | 2003-086159 | 3/2003 |
| WO | WO-01-99211 | 12/2001 |

\* cited by examiner

BATTERY PACK

TECHNICAL FIELD

The present invention relates to a battery pack which is reduced in size, weight, and thickness so as to be used as a battery power source for portable electronic equipment that is increasingly reduced in size as well as in thickness.

BACKGROUND ART

There is an increasing demand for reduction in size, weight, and thickness of portable information equipment and portable audio equipment such as a portable telephone and a mobile computer so as to improve their portability. It would not be an exaggeration to state that a battery power source is the key to realize such a reduction. In particular, there is a strong demand for reduction in weight and thickness of a battery power source device using a rechargeable battery.

As a rechargeable battery constituting a battery power source device of portable equipment, a nickel-cadmium battery, a nickel metal hydride battery, and a lithium ion rechargeable battery are used. Above all, the lithium ion rechargeable battery is optimal as a power source battery of portable electronic equipment because it has high mass energy density and weight energy density. However, in addition to its extremely high energy density, the lithium ion rechargeable battery uses a flammable organic solvent as an electrolyte solution. Therefore, it is necessary to ensure safety in the case where the battery gets into an abnormal state. It is believed that the abnormal state is caused by an electrical, mechanical, thermal factor, and the like. The abnormal state refers to, for example, overcharge, short circuit, pressing, overheating and the like. The lithium ion rechargeable battery is provided with a protective function such as a PTC (Positive Thermal Coefficient) element for protecting the battery against short circuit or overheating or a battery protecting circuit for protecting the battery against overcharge, overdischarge and the like, or a safety function such as a gas exhaust vent for externally exhausting an abnormal internal pressure so as to prevent the battery from exploding. The safety function is provided for the battery itself, whereas the battery protecting circuit or the PTC constituting the protective function is housed with the battery in a pack case so as to be configured in a battery pack form.

FIG. 8 is an exploded view illustrating an exemplary structure of a battery pack using a flat prismatic lithium ion rechargeable battery. A lithium ion rechargeable battery 60 formed in a flat prismatic shape, and a circuit board 61 and a PTC 62, which form a battery protecting circuit, are housed within a pack case composed of an upper case 51 and a lower case 52. Charge and discharge can be achieved through external connection terminals 54 provided on a side face of the lower case 52.

The reduction in thickness of portable electronic equipment is considerably pursued so as to improve the portability. Therefore, there is an increasing demand for reduction in thickness of a battery pack serving as a power source. In order to realize the reduction in thickness of the battery, however, a battery capacity should be sacrificed. In addition, there is a limit to reduce the thickness in view of the structure of the battery.

Since there is a limit to reduce the thickness of the battery itself, a thickness of a pack case is necessarily reduced so as to reduce the thickness as a battery pack. The case, which is a resin molding product, is required to have about 0.25 mm as the minimum thickness allowing the molding. The quality of a molding cannot be kept due to lowered moldability or a degraded surface property in resin molding at the minimum thickness, thereby lowering the mass-productivity. Moreover, the thickness of the case is reduced and the like to lower the strength of the case. Therefore, there is a limit of the reduction in thickness so as to obtain the strength that is high enough to protect the battery and the other components.

The present invention has an object of providing a battery pack that is reduced in thickness by using a film as a surface of a pack case, which surface otherwise constitutes a limit thickness of molding in resin molding, so as to reduce a thickness of the pack case to the limit.

DISCLOSURE OF THE INVENTION

In order to achieve the above object, the present invention is a battery pack including: one or a plurality of rechargeable batteries being arranged in a planar manner, the rechargeable battery is housed within a flat and approximately prismatic outer case; and an external connection terminal being connected to the rechargeable battery, the external connection terminal is externally exposed, wherein an arbitrary range of at least one principal face of the outer case is formed of a film member, whereas the remaining part is formed of a resin molding; and the external connection terminal is externally exposed from an arbitrary side circumferential surface, through which the external connection terminal is externally exposed from a portion where the resin molding is formed.

The arbitrary range is at least a region in contact with the rechargeable battery.

According to the above structure, since the arbitrary range of at least one principal face of the outer case housing the rechargeable battery is formed of the film member, a thickness of the battery pack is reduced to a thickness of the battery and the film member. Therefore, a thickness, which cannot otherwise be achieved if the entirety is formed of a resin molding, is realized. As a result, a battery pack suitable as a battery power source of portable electronic equipment, which is strongly required to be reduced in thickness, is obtained.

Moreover, although the mass-productivity is degraded due to poor moldability of a part having a small thickness in a conventional method using an outer case obtained by resin molding, the mass-productivity is improved by using the film member. Furthermore, although the principal faces are required to satisfy both the moldability of a material and the mechanical strength for the conventional outer case obtained by resin molding, the use of film members allows the selection of a material with a high regard for the mechanical strength.

Moreover, the region other than the above-mentioned arbitrary range and the side faces are formed of a resin molding. A material is selected for the resin molding in consideration of the bonding ability with the film member, the strength, and the moldability.

Furthermore, in order to achieve the above object, the present invention is a battery pack including: a pair of upper and lower outer cases, each being formed as an approximately prismatic half-shell body by resin molding, the outer cases are provided so as to face each other at the respective openings to be bonded at the respective open ends; one or a plurality of rechargeable batteries and a battery circuit being housed within the bonded outer cases; and an external connection terminal being externally exposed from an arbitrary side circumferential surface, wherein an arbitrary range of a part corresponding to a bottom face of at least one of the half-shell bodies of the pair of upper and lower outer cases is formed of a film member, whereas the remaining part is formed of a resin molding.

According the above structure, since any one of or both of the upper and lower bottom faces of the outer cases housing the rechargeable battery and the battery circuit therein is formed of a film member, a thickness of the battery pack is reduced to a thickness of the battery and the film member. Therefore, a thickness, which cannot otherwise be achieved if the entirety is formed of a resin molding, is realized. As a result, a battery pack suitable as a battery power source of portable electronic equipment, which is strongly required to be reduced in thickness, is obtained.

In the above-structure, a circumferential edge of the film member is formed by insert molding into the resin molding so that the film member and the resin molding are integrated with each other. As a result, the outer case having high mechanical strength even at a small thickness are formed.

Moreover, when a battery pack is formed with a plurality of rechargeable batteries, a resin molding is formed on the film member so as to fill a gap formed between the rechargeable batteries arranged adjacent to each other. As a result, since no space is formed below the film member, the plurality of rechargeable batteries and the resin molding formed on the film member are integrated with each other. As a result, the positions of the housed rechargeable batteries are regulated, thereby remarkably enhancing the strength as a battery pack.

Moreover, by forming the film member as a composite film obtained by bonding a hard film on its outer face, the part corresponding to the film member is restrained from being scratched, thereby improving the surface properties and the appearance.

By forming an adhesive layer on the inner face of the film member, the film member is bonded to a flat face of the rechargeable battery so as to fix its position. At the same time, the film member is prevented from being deformed by application of a pressure.

Moreover, a reinforced plastic film, which is obtained by fixing glass fibers, carbon fibers or the like serving as a core material with an epoxy resin or the like, is used as the film member so as to enhance the strength of the outer case.

Moreover, by forming a gas vent port through an arbitrary side face of the outer case, a released gas is externally exhausted when an abnormal internal pressure is released from a gas exhaust port provided for the rechargeable battery. Therefore, the outer case is not expanded. Since expansion is likely to occur in the case where the larger faces of the outer case are formed of film members, the gas vent port for externally exhausting the gas is an important requirement.

Furthermore, the battery circuit is configured with a circuit board. After the circuit board is provided on a shorter side face of the rechargeable battery, the rechargeable battery and the circuit board are integrated with each other. As a result, the operation of housing the rechargeable battery and the circuit board within the outer case is facilitated.

Furthermore, the battery circuit is configured with the circuit board. The circuit board is provided for the outer case, so that the circuit board is fixed to the outer case. As a result, the circuit board is held surely. Therefore, it becomes easy to form the external connection terminal on the circuit board and to externally expose the external connection terminal through an opening formed through the side circumferential surface of the outer case.

BEST MODE FOR CARRYING OUT THE INVENTION

Hereinafter, an embodiment of the present invention will be described with reference to the accompanying drawings for understanding of the present invention. The following embodiment is merely an example embodying the present invention, and therefore does not limit a technical scope of the present invention.

Figure 1:
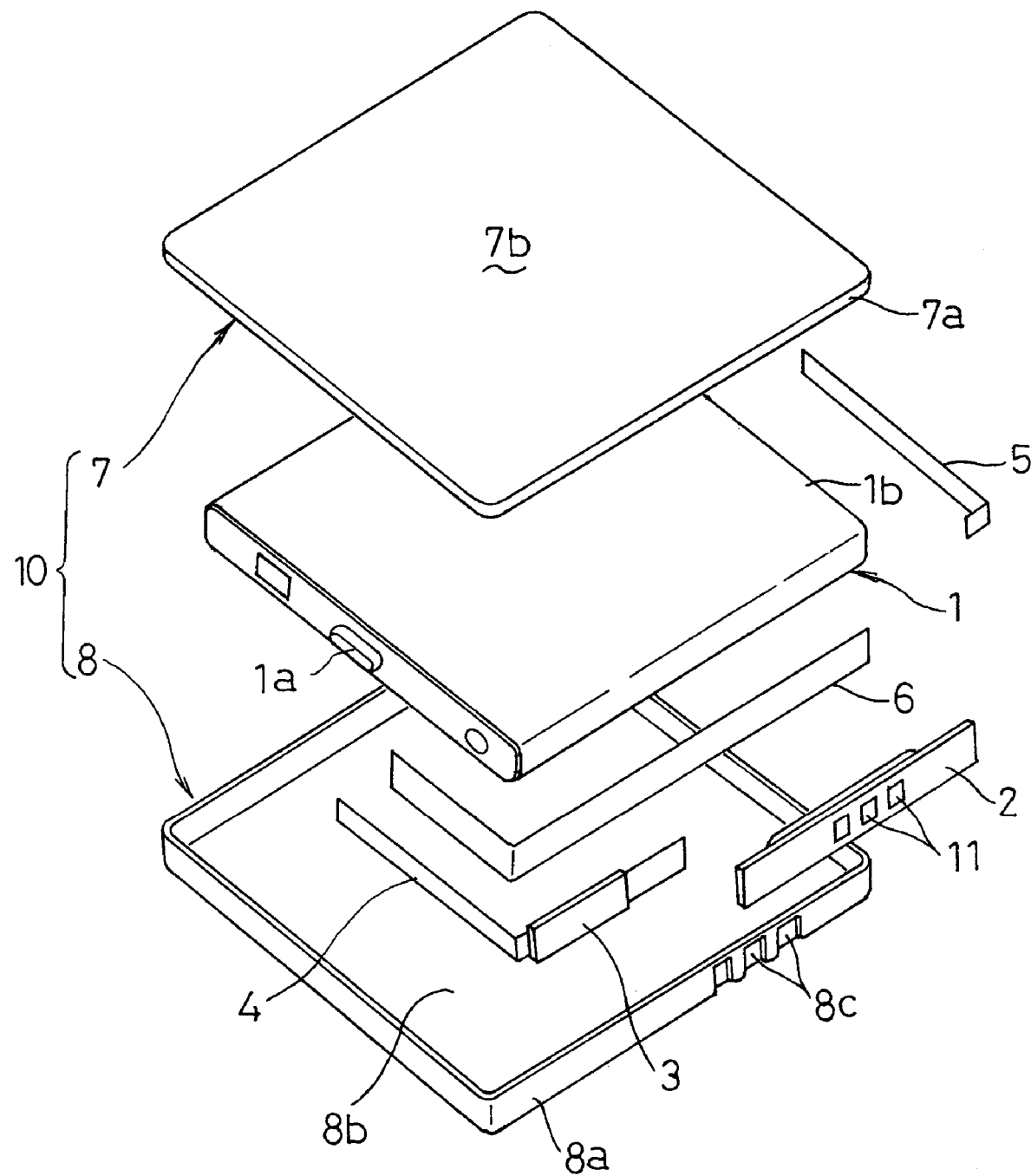
FIG. 1 is an exploded perspective view showing a structure of a battery pack according to a first embodiment.

FIG. 1 shows a structure of a battery pack according to the first embodiment. The battery pack is formed so that a flat prismatic lithium ion rechargeable battery (hereinafter, referred to as a rechargeable battery) 1 and battery circuit components such as a circuit board 2 constituting a battery protecting circuit for protecting the rechargeable battery 1 from overcharge, overdischarge and the like are housed within an outer case 10 formed by bonding an upper case 7 and a lower case 8, each being formed as a half-shell body, to each other. The battery pack is intended to be reduced in thickness so as to meet the requirements of reduction in thickness of portable electronic equipment for which the battery pack is used.

In order to reduce the thickness of the battery pack, it is effective to reduce a thickness of the rechargeable battery 1. However, there is a limit to reduce the thickness of the battery so as to obtain a required battery capacity. In this case, a bottom face of each of the upper case 7 and the lower case 8, which are respectively formed as half-shell bodies, is made of a film member, thereby reducing the thickness of the outer case 10.

Figure 2:
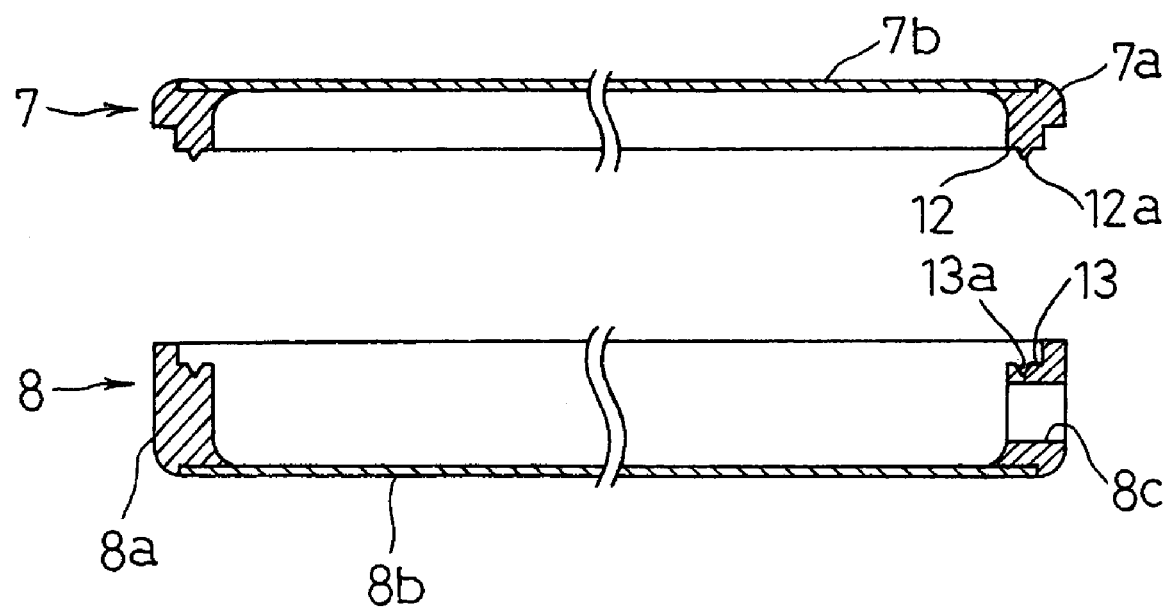
FIG. 2 is a cross-sectional view of an outer case in the structure.

FIG. 2 is a cross-sectional view showing the upper case 7 and the lower case 8. A bottom face of the upper case 7 formed as a half-shell body is formed of a film member 7b, whereas a side circumferential part is formed of a resin molding 7a. The film member 7b is integrally formed with the resin molding 7a at the resin molding of the resin molding 7a so that the entirety is formed as a half-shell body having the film member 7b as a bottom face. The lower case 8 is formed in a similar manner. A bottom face is formed of a film member 8b. A side circumferential part is formed of a resin molding 8a. The film member 8b is integrally formed with the resin molding 8a at the resin molding of the resin molding 8a so that the entirety is formed as a half-shell body having the film member 8b as a bottom face. Although the entire bottom faces of the upper case 7 and the lower case 8 are respectively formed of the film members 7b and 8b in this case, the film member is not necessarily provided for the entire bottom face of the lower case 8. Only the parts facing the rechargeable battery 1 may be formed as the film members 7b and 8b, and a rib for holding the board or the like is formed by resin molding at the position of the bottom face where the circuit board 2 is provided.

PET film is suitable for the film members 7b and 8b. Although the PET film having a thickness of 50 μm or more is used, the film members having a thickness of 100 to 300 μm are preferable in view of ensuring of the strength as the outer case 10 or thermal effects at the resin molding. Alternatively, PC (polycarbonate) or PMMA (methacrylate resin) is also usable as the film members 7b and 8b. In the case where the strength is to be improved, a reinforced plastic film obtained by fixing glass fibers or carbon fibers serving as a core material with an epoxy resin or the like is used.

By using a composite film member obtained by forming a hard cover PET layer on the outer face of a PET film as each of the film members 7b and 8b, scratches are restrained from being formed so as to improve the surface properties and the appearance. Moreover, by forming an adhesive layer on the inner face of each of the film members 7b and 8b, the film members are bonded to flat faces of the rechargeable battery 1 so as to fix the position of the rechargeable battery 1. At the same time, when a pressure is applied onto the film member faces, deformation does not occur. Therefore, the fragility due to the use of the films for the exterior is eliminated.

Although PC, or PP (polypropylene) or PA (polyamide) is suitable as a material of molding for the resin moldings 7a and 8a, the material is not limited thereto.

For the upper case 7 and the lower case 8 having the above structure, the resin moldings 7a and 8a are formed by resin molding after the film members 7b and 8b are inserted into a molding die. As a result, the film members 7b and 8b are integrated with the resin moldings 7a and 8b, respectively. A battery pack using the upper case 7 and the lower case 8 is assembled as follows.

In FIG. 1, an end of a negative electrode lead plate 5 is welded to a bottom of a battery case 1b, which forms a negative electrode terminal of the rechargeable battery 1. An end of a positive electrode lead plate 4 is welded to a positive electrode terminal 1a of the rechargeable battery 1. The other end of the negative electrode lead plate 5 is soldered to a predetermined position of the circuit board 2. The positive electrode lead plate 4 is insulated from the battery case 1b by an insulating paper 6. The other end of the positive electrode lead plate 4 is soldered to one electrode of a PTC element 3, whereas the other electrode of the PTC element 3 is soldered to a predetermined position of the circuit board 2. Since the rechargeable battery 1 and the circuit board 2 are integrated with each other by this wiring connection, the entirety is housed within the lower case 8. External connection terminals 11 are formed on the circuit board 2. When the rechargeable battery 1 and the circuit board 2 are housed within the lower case 8, the external connection terminals 11 are externally exposed through terminal windows 8c formed through the resin molding 8a of the lower case 8.

As shown in FIG. 2, in the side circumferential parts of the upper case 7 and the lower case 8, fitting portions 12 and 13, which form steps by the resin moldings 7a and 8b to fit each other, are formed. After the rechargeable battery 1 and the circuit board 2 are housed within the lower case 8 as described above, the lower case 8 is capped with the upper case 7 so that their respective fitting portions 12 and 13 fit each other. When ultrasonic vibration is vertically applied in this state, the upper case 7 and the lower case 8 are ultrasonically bonded to each other, thereby completing a battery pack. For the above-described fitting portions 12 and 13, a rib portion 12a is formed for one of them, whereas a groove portion 13a is formed for the other. In fitting, the rib portion 12a fits into the groove portion 13a so that they are ultrasonically bonded to each other at the application of ultrasonic vibration, thereby restraining the effects on bonding interfaces between the film members 7b and 8b and the resin moldings 7a and 8a in the upper case 7 and the lower case 8, respectively. Instead of the structure in which the fitting portions 12 and 13 are respectively provided for the resin moldings 7a and 8a serving as the side circumferential parts of the upper case 7 and the lower case 8 so as to be bonded through ultrasonic vibration, another structure, in which the resin moldings 7a and 8a are bonded to each other in their side circumferential parts by claw fitting, is used.

The above-mentioned battery pack is provided with a function of protecting the rechargeable battery 1 against short circuit, overcharge, overdischarge, or the like. Nonetheless, if a gas is formed in the rechargeable battery 1 by unexpected occurrences to abnormally increase an internal pressure of the battery, a safety vent provided for the rechargeable battery 1 is activated to release the gas from the rechargeable battery 1. As a result, the rechargeable battery 1 is prevented from exploding. The gas released from the rechargeable battery 1 is externally exhausted through gaps between the terminal windows 8c formed through the outer case 10 and the external output terminals 11 as gas vent ports. Therefore, the outer case 10 is never filled with the gas to be expanded. In the case where the larger faces of the outer case are made of the film members, expansion is likely to occur. However, by externally exhausting the gas, the deformation due to expansion is prevented. The gas vent port is also formed by providing a notch in a part of each of the ribs 12a and the groove portions 13a of the fitting portions 12 and 13 of the upper case 7 and the lower case 8.

The above-described battery pack is formed so as to be used for relatively low power-consumption portable electronic equipment using a single rechargeable battery 1, for example, a portable telephone, or a digital camera. If it is formed so as to be used for relatively high power-consumption portable electronic equipment such as a notebook personal computer, a plurality of rechargeable batteries 1 is connected in series and/or in parallel to form a battery pack.

Figure 3:
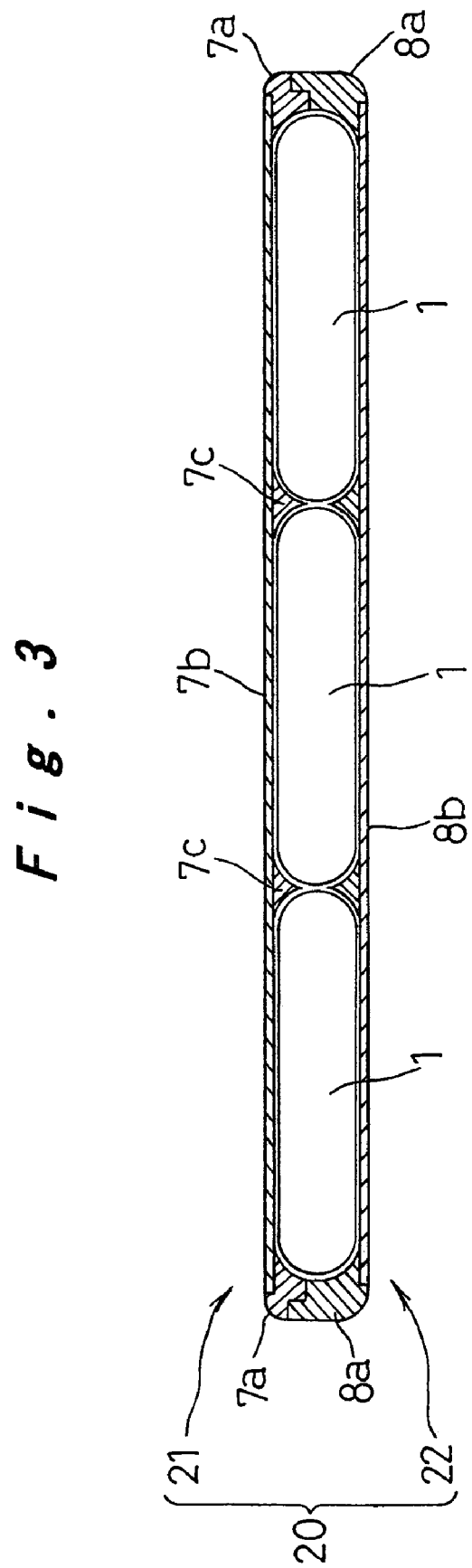
FIG. 3 is a cross-sectional view of a battery pack according to a second embodiment.

FIG. 3 is a cross-sectional view showing a structure of a battery pack according to the second embodiment, in which a plurality of the rechargeable batteries 1 are connected in series-parallel. In this case, six flat prismatic lithium ion rechargeable batteries 1 are arranged in an array of 3 by 2 on a plane. The rechargeable batteries are electrically connected to each other in series-parallel so as to be housed with a battery circuit within the outer case 20 to form a battery pack as the above-described battery pack.

If a cross-sectional shape of the rechargeable battery 1 is oblong as illustrated, a gap is formed between the adjacent rechargeable batteries 1 in parallel arrangement. A filler resin molding 7c is formed on the film member 7b at the resin molding of the upper case 21 so as to fit into the gap, whereas a filler resin mold 8c is formed on the film member 8b at the resin molding of the lower case 22 so as to fit into the gap.

With the above-described structure, in the case where the plurality of rechargeable batteries 1 are housed within the outer case 20 where the bottom faces of the half-shell bodies are formed of the film members 7b and 8b, the area of the film members 7*b* and 7*b* becomes large. However, since the film members 7*b* and 8*b* and the rechargeable batteries 1 are integrated with each other, the strength is restrained from being lowered. Therefore, even if a pressure is applied to a part of the film members 7*b* and 8*b* covering the gap, deformation does not occur. It is extremely difficult to form such a large area only by resin molding at a similar thickness to that of the film members 7*b* and 8*b*. However, the film members 7*b* and 8*b* and the resin moldings 7*a* and 8*a* are integrally molded as in this structure, thereby achieving the reduction of the thickness of the outer case 10.

Figure 4:
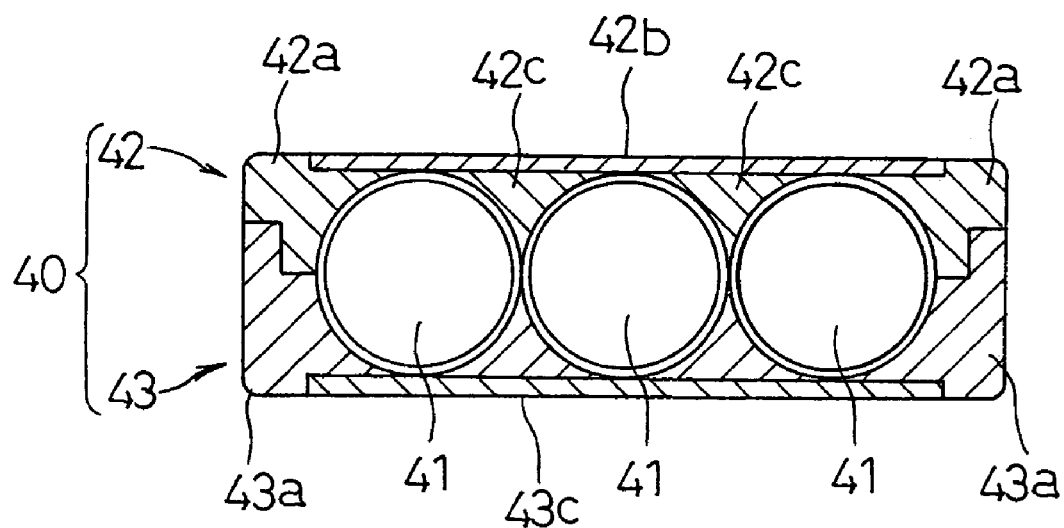
FIG. 4 is a cross-sectional view of a battery pack according to a third embodiment.

FIG. 4 is a cross-sectional view showing a structure of a battery pack according to the third embodiment. A plurality of cylindrical rechargeable batteries 41 are arranged in parallel so as to be housed with a circuit board not shown within an outer case 40, thereby forming a battery pack. In FIG. 4, even in the case where the rechargeable battery 41 is a cylindrical battery, gaps are also formed above and below the batteries between the adjacent batteries. A filler resin molding 42*c* is formed on a film member 42*b* at the resin molding of an upper case 42 so as to fit into the gap, whereas a filler resin molding 43*c* is formed on a film member 43*b* at the resin molding of a lower case so as to fit into the gap. The formation of the filler resin moldings 42*c* and 43*c* prevents the strength from being lowered even if the area of the film members 42*b* and 43*b* becomes large because the rechargeable batteries 41 and the film members 42*b* and 43*b* are integrated with each other. The deformation does not occur either in the case where a pressure is applied to the film members 42*b* and 43*b* covering the gaps.

Figure 5:
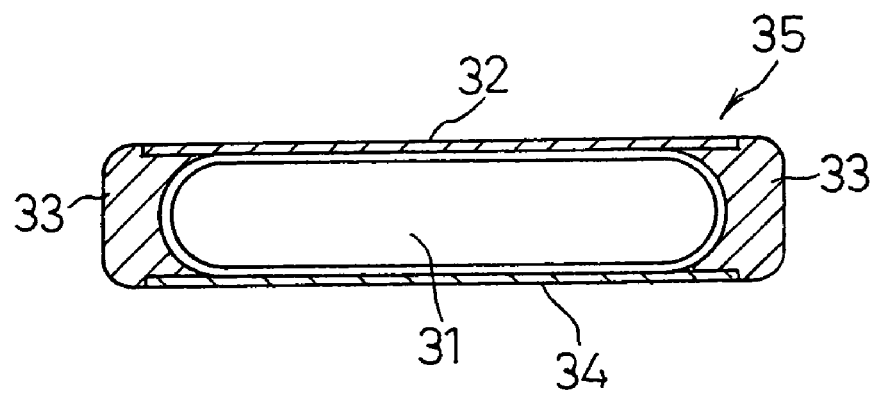
FIG. 5 is a cross-sectional view of a battery pack according to a fourth embodiment.

FIG. 5 is a cross-sectional view of a battery pack according to the fourth embodiment. A flat prismatic rechargeable battery 31 is housed with a circuit board not shown within an outer case 35 to form a battery pack. The battery pack is characterized by a method of forming the outer case 35.

Figure 6:
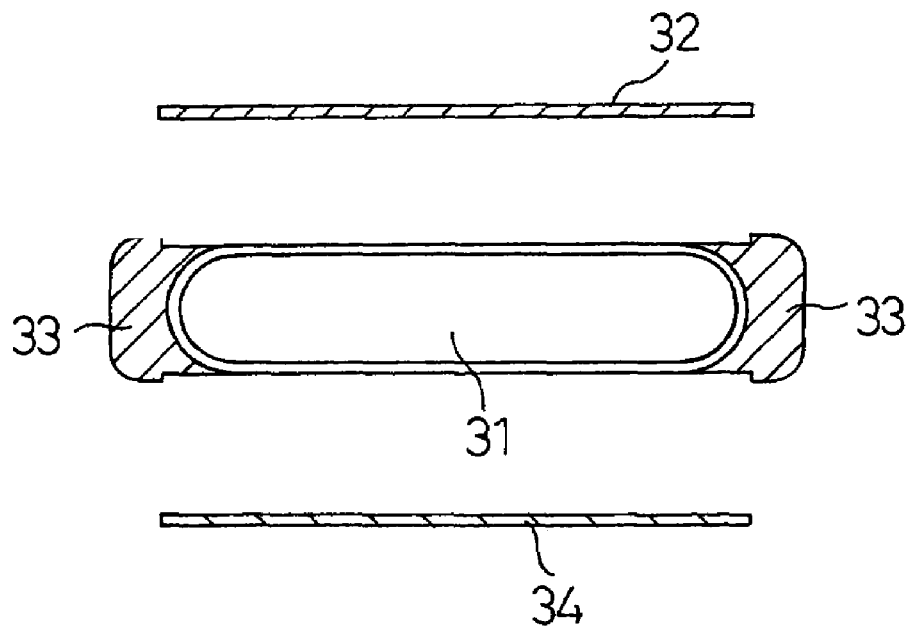
FIG. 6 is a cross-sectional view showing a step in the middle of assembly of the battery pack according to the fourth embodiment.

FIG. 6 shows a state where the flat prismatic rechargeable battery 31 and battery circuit components (not shown) such as a battery protecting circuit for protecting the rechargeable battery 31 against overcharge, overdischarge and the like and a circuit board, on which external connection terminals are formed, are provided within a resin molding 33 which is molded in advance. The resin molding 33 has such a structure that, for example, it is divided into four so as to correspond to four side circumferential surfaces. After the rechargeable battery 31 and the battery circuit components are provided inside the resin molding, they are integrated with each other. Moreover, the resin molding 33 is provided with terminal windows (not shown) through which the external connection terminals are externally exposed. This state is also achieved by first integrating the rechargeable battery 31 and the battery circuit components with each other, followed by the formation of the resin molding 33 in the side circumference parts by a method such as resin molding. In this manner, in the state where the rechargeable battery 31 and the battery circuit components are provided within the resin molding 33, film members 32 and 34 are provided to face upper and lower flat surfaces. When the resin molding 33 and the film members 32 and 34 are integrated with each other by, for example, laser welding, ultrasonic welding or the like, a battery pack shown in FIG. 5 is completed. The laser welding is advantageous in its facility of control of welding strength because the welding of a portion to be welded is ensured. In addition, a trace of the welding is hardly varied. Moreover, if an adhesive layer is formed on a surface of each of the film members 32 and 34 in contact with the rechargeable battery 31, the rechargeable battery 31 and the film members 32 and 34 are integrally formed so as to further enhance the strength as the battery pack.

Both the upper and lower film members 32 and 34 are integrated with the resin molding 33 at the last step in the above description. However, the battery pack shown in FIG. 5 is also formed by integrally forming the resin molding 33 with any one of the film members, for example, the film member 34 so that the other film member 32 is integrated with the resin molding 33 in the state where the battery circuit components and the rechargeable battery 31 are provided within the resin molding 33.

Figure 7:
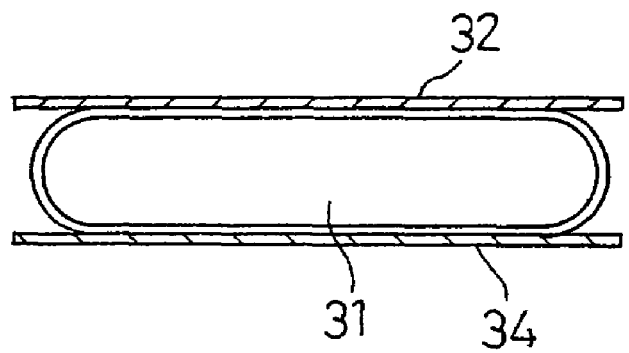
FIG. 7 is a cross-sectional view showing another step in the middle of assembly of the battery pack according to the fourth embodiment.
Figure 8:
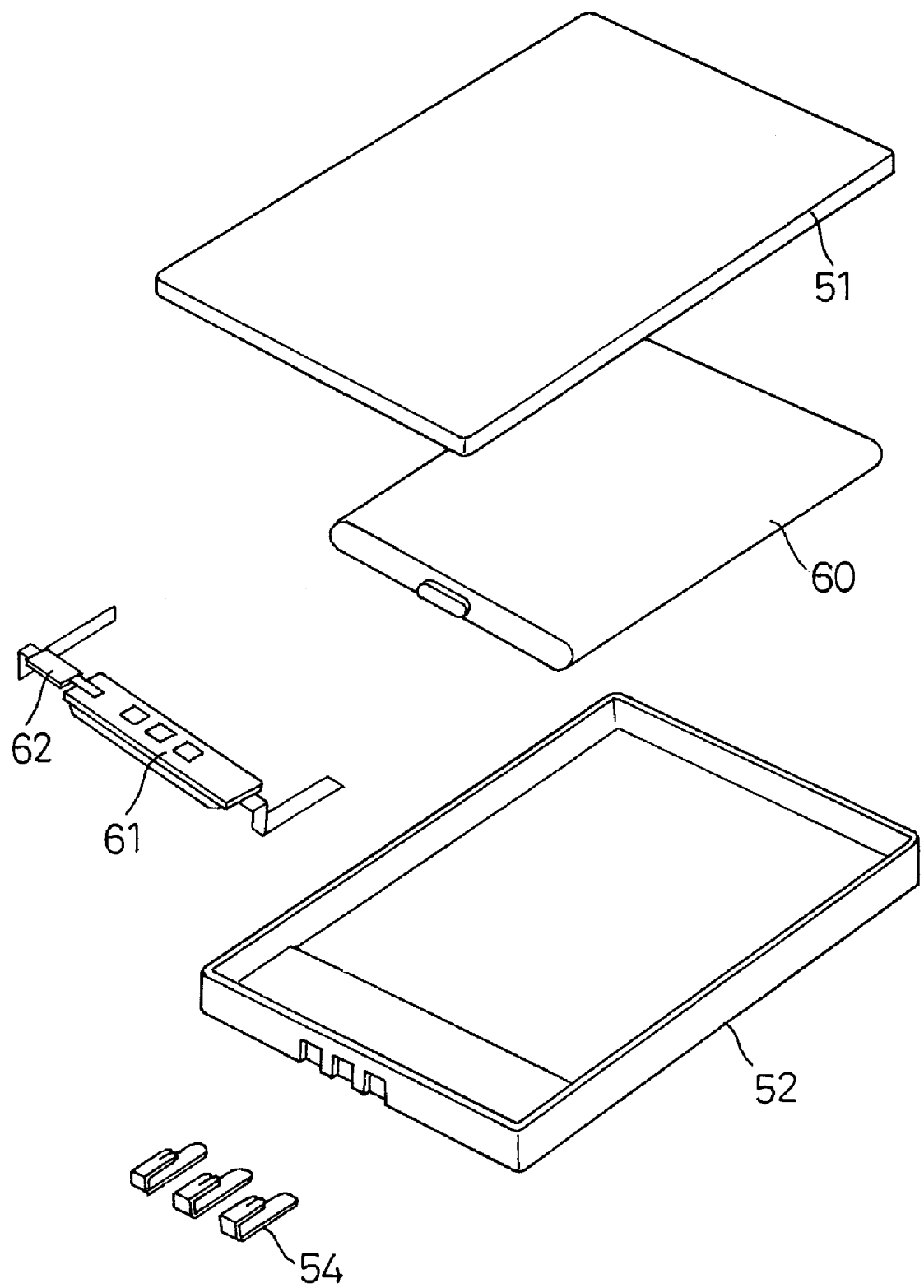
FIG. 8 is an exploded perspective view showing a structure of a battery pack according to the prior art.

FIG. 7 shows a state where the rechargeable battery 31 and battery circuit components (not shown) are integrated with each other so that the film members 32 and 33 are provided to face the upper and lower flat faces. If the side circumference of the resin molding 33 is formed by resin molding or the like in this state, the film members 32 and 34 and the resin molding 33 are integrated with each other to complete the battery pack shown in FIG. 5.

INDUSTRIAL APPLICABILITY

According to the present invention, since the bottom faces of the case formed in a flat shape are made of film members, the outer case is reduced in thickness, thereby allowing the formation of a thin battery pack. Accordingly, the present invention is suitable to provide a battery pack meeting the requirements of reduction of the thickness of portable electronic equipment.

The invention claimed is:

1. A battery pack, comprising:
   a flat and approximately prismatic outer case including a pair of divided-shell bodies, an arbitrary range of at least one principal outer face of at least one of the divided-shell bodies being formed of a plastic film member, and a remaining portion of each of said divided-shell bodies being formed of a resin molding, said plastic film member being integrated with at least one said resin molding such that said resin molding, integral with said plastic film member, together comprise a same respective one of said divided-shell bodies, said at least one resin molding including a frame structure defining an oven region bounded peripherally by said frame structure, said open region being closed exclusively by the plastic film member;
   at least one rechargeable battery being housed in a planar manner within said outer case; and
   an externally accessible connection terminal connected to the rechargeable battery, the external connection terminal being accessibly exposed at a portion of said case where the resin molding is formed.

2. A battery pack, comprising:
   an outer case being formed as two approximately prismatic half-shell bodies, the half-shell bodies being provided so as to face each other at respective openings thereof to be bonded together, an arbitrary range of a portion corresponding to an outer face of at least one of the half-shell bodies of the outer case being formed of a plastic film member, and a remaining portion of said at least one of the half-shell bodies being formed of a resin molding, said plastic film member of said at least one of the half-shell bodies being integrally formed with said resin molding of said at least one of the half-shell bodies such that said resin molding, integral with said plastic film member, together comprise a same respective one of said half-shell bodies, said plastic film member of said at least one of the half-shell bodies being arranged orthogonally to a thickness direction of said resin molding, said resin molding having a maximum thickness extending between two planes, said plastic film member of said at least one of the half-shell bodies having an outer face which is flush with a one of said two planes;

at least one rechargeable battery and a battery circuit housed within the outer case formed when said half-shell bodies are bonded together; and an externally accessible connection terminal being accessible via an arbitrary side circumferential surface.

3. The battery pack according to any one of claims 1 and 2, wherein a circumferential edge of the film member is formed by insert molding into the resin molding.

4. The battery pack according to any one of claims 1 and 2, wherein the resin molding includes a filler resin molding which is formed on the film member so as to fill a gap formed between the rechargeable batteries arranged adjacent to each other when the plurality of rechargeable batteries are arranged.

5. The battery pack according to any one of claims 1 and 2, wherein the film member is formed as a composite film obtained by bonding a hard film on its outer face.

6. The battery pack according to any one of claims 1 and 2, wherein an adhesive layer is formed on the inner face of the film member.

7. The battery pack according to any one of claims 1 and 2, wherein the film member is a reinforced plastic film having a core material in a resin.

8. The battery pack according to any one of claims 1 and 2, wherein a gas vent port is formed in the resin molding of the outer case.

9. The battery pack according to claim 1, wherein a battery circuit is configured with a circuit board, and the circuit board is provided on a shorter side face of the rechargeable battery.

10. The battery pack according to claim 2, wherein the battery circuit is configured with a circuit board, and the circuit board is provided on a shorter side face of the rechargeable battery.

11. The battery pack according to any one of claims 9 and 10, wherein the external connection terminal is formed on the circuit board and the external connection terminal is externally exposed through an opening formed through the side circumferential surface of the outer case.

12. The battery pack according to claim 1, wherein a battery circuit is configured with the circuit board, and the circuit board is provided for the outer case.

13. The battery pack according to claim 2, wherein the battery circuit is configured with the circuit board, and the circuit board is provided for the outer case.

14. The battery pack according to any one of claims 12 and 13, wherein the external connection terminal is formed on the circuit board and the external connection terminal is externally exposed through an opening formed through the side circumferential surface of the outer case.

15. A battery pack, comprising:

a rechargeable battery unit comprised of at least one rechargeable battery, said rechargeable battery unit having a length and a width arranged along a battery plane and which is bounded by an outer perimeter, a respective dimension of each of said length and said width being relatively larger that a thickness of the rechargeable battery unit extending crosswise to said battery plane;

an outer case in which said rechargeable battery unit is received in a planar manner, said outer case including a resin molding comprised of resin molding segments which are collectively arranged in a circumferentially divided manner about said outer perimeter, said outer case further including at least one plastic film member being integrated with said resin molding to overlay at least a portion of said rechargeable battery unit extending along the length and width of said rechargeable battery unit inward of said outer perimeter thereof; and an externally accessible connection terminal connected to the rechargeable battery, the external connection terminal being accessibly exposed at a portion of said case where the resin molding is formed.

16. The battery pack according to claim 1, wherein:

said plastic film member of said at least one of the half-shell bodies is arranged orthogonally to a thickness direction of said resin molding;

said resin molding has a maximum thickness extending between two planes; and said plastic film member of said at least one of the half-shell bodies has an outer face which is flush with a one of said two planes.

17. The battery pack according to claim 2, wherein:

said resin molding includes a frame structure defining an open region bounded peripherally by said frame structure; and said open region is closed exclusively by the plastic film member.

18. The battery pack according to any one of claims 1 and 2 wherein a thickness of the plastic film member is 50 μm or more, yet less than 220 μm.

* * * * *